United States Patent [19]
Maglieri

[11] Patent Number: 5,704,567
[45] Date of Patent: Jan. 6, 1998

[54] BLADE DE-ICER FOR ROTARY WING AIRCRAFT

[75] Inventor: John Michael Maglieri, Williamsburg, Va.

[73] Assignee: The United States of America as represented by the Secretary of the Army, Washington, D.C.

[21] Appl. No.: 543,688

[22] Filed: Oct. 16, 1995

[51] Int. Cl.[6] ............................................. B64D 15/12
[52] U.S. Cl. .................................. 244/17.11; 244/134 D
[58] Field of Search ...................... 244/17.11, 134 D; 200/61.19; 310/254, 261

[56] References Cited

U.S. PATENT DOCUMENTS

| | | | |
|---|---|---|---|
| 2,429,061 | 10/1947 | Hunter | 244/134 D |
| 2,444,557 | 7/1948 | Eaton | 244/134 D |
| 2,491,172 | 12/1949 | Forsyth | 244/134 D X |
| 2,678,181 | 5/1954 | Geyer et al. | 244/134 D |

FOREIGN PATENT DOCUMENTS

| | | | |
|---|---|---|---|
| 863490 | 4/1941 | France | 244/134 D |
| 2281273 | 3/1976 | France | 244/134 D |

*Primary Examiner*—William Grant
*Attorney, Agent, or Firm*—Arthur H. Tischer; John H. Lamming; Freddie M. Bush

[57] ABSTRACT

A blade de-icer for rotary wing aircraft comprises magnets placed around the rotor mast and coils with laminated plates installed at the blade cuff of each rotor blade, in sufficient proximity to produce a high voltage, high current pulse every time a magnet and a coil pass each other while the rotor is turning. Electrically conductive cable or wire carries the current down each rotor blade to heating elements which melt any accreted ice on the blade. In one embodiment, magnetic metals are used. In another embodiment, electromagnets are used. In each embodiment, difficult switches for turning the de-icer on and off are provided.

9 Claims, 7 Drawing Sheets

BLADE DE-ICER FOR ROTARY WING AIRCRAFT

STATEMENT OF GOVERNMENT INTEREST

The invention described herein may be manufactured, used and licensed by or for the U.S. Government for U.S. Governmental purposes without the payment to me of any royalty thereon.

BACKGROUND OF THE INVENTION

1. Field of the Invention

The invention relates to de-icers for aircraft, and more particularly, to de-icers for helicopter rotor blades that operate by transmitting power through magnets and coils.

2. Description of the Prior Art

The accumulation of ice on aircraft wings and helicopter rotor blades and other aircraft structural members in flight presents well known dangers. Attempts have been made since the earliest days of flight to overcome the problems and dangers associated with ice accumulation. While different techniques have been advanced to remove ice from aircraft during flight, these techniques have had drawbacks necessitating further and continued research in the field.

There are, broadly, two approaches for providing active icing protection for aircraft in flight (i.e., icing protection provided by means incorporated into the airframe or some structural member of the aircraft, such as wings or rotor blades, as distinguished from passive means, such as acceleration to a sufficient speed that aerodynamic heating maintains the surface subject to ice accretion at a temperature above that needed to maintain vapor, water droplets, etc. in a frozen state). These means are de-icing and anti-icing.

In de-icing methods, ice is allowed to build up on the protected surfaces and then is periodically shed in some manner before its size, thickness or weight becomes excessive. De-icing systems typically include electro-thermal and mechanical devices. Electro-thermal de-icers use electrical resistance heating. Other electrically based systems use magnetic coils to produce vibration or torque to distort the surface on which ice accumulates to remove the accreted ice by breaking up the formations. Both attractive and repulsive electromagnetic forces may be used in these types of devices. Mechanical devices include those using boots or expandable tube-like devices that are periodically inflated or displaced in some manner to distort in some manner the leading edge of the aircraft structural component, thereby cracking the accumulated ice formation.

In anti-icing methods, ice may or may not be allowed initially to accrete to a surface. Once any accumulated ice is shed, the surface is maintained free of ice by the anti-icing system employed. Anti-icing methods include electro-thermal, which use continuously applied electrical power for resistance heating; hot gases fed through conduits; and chemical fluids for freezing point lowering which fluids are fed through tiny orifices in the protected surface. By lowering the freezing point of water well below 32° F. (0° C.), impinging water droplets typically found in high altitude vapors, do not form ice on leading edge surfaces.

Icing problems associated with aircraft include the wing leading edges on airplanes and the rotor blade leading edges on helicopters. Wing and rotor blade leading edge icing cause, inter alia, drag increase, loss of lift, increased stall speed, increased use of fuel and unstabilized flight. The presence of ice, even a thin layer, on aircraft wing or helicopter rotor leading edges can result in flow separation and consequential interruption in lift or crash of the aircraft in extreme cases. On jet aircraft and in some helicopter applications, ice on leading edges can cause engine damage resulting from the ice being shed.

Each of the prior art methods of de-icing and anti-icing summarized above has disadvantages or deficiencies. Hot gas systems require high energy input and also require a network of conduits to carry the gases to a protected surface. Further, not all engines have a sufficient bleed air supply for thermal gas systems. Chemical de-icing and anti-icing systems are found wanting because they have high weight penalties and have limited time applications (they run out of chemical anti- and de-icers). Chemical systems may also be expensive to stock and use. Mechanical systems require high maintenance, produce increased aerodynamic drag, may collect ice, and have limited service life. Electro-thermal systems of the prior art are heavy, expensive, and require high energy input. For example, composite laminates which utilize embedded electrically conductive wire through which current is passed, may have a deleterious effect on the airframe structure. Typically, such materials are used for purposes other than anti-icing and deicing. Some of these systems require increased fuel use and thereby increase costs and reduce efficiency of flight operations.

Alternatives to mechanical, chemical and thermal gas systems have been found by using electromagnetic impulses to mechanically force accreted ice from protected aircraft surfaces. Generally, electromagnetic impulse systems use a bank of high voltage capacitors which are discharged through a coil positioned next to the interior of a leading edge surface (such as an aircraft fixed wing) resulting in a rapidly forming and collapsing magnetic field which induces eddy currents in the thin metal skin of the aircraft structural element. A large but short lived repulsive magnetic force is created. This force in turn causes small but rapid movement, like vibration, of the metal skin of the protected structural element to shatter the ice layer and allow the accreted ice to blow off the structure.

A fairly advanced disclosure of such a system is found in U.S. Pat. No. 4,895,322 dated Jan. 23, 1990 to Zieve. This system is an example of an electromagnetic de-icing system useful in fixed wing aircraft. The system includes at least one self-contained electromagnetic de-icing module which includes an actuator coil positioned in close proximity to the interior side of the aircraft surface to be de-iced (e.g., the leading edge of an airplane fixed wing). The magnetic force pulse debonds accreted ice from the protected surface. An electromagnetic impulse de-icing device for an aircraft airfoil is disclosed in U.S. Pat. No. 4,678,144 dated Jul. 7, 1987 to Goehner, et al. This system is an improvement upon basic electromagnetic wave deformation de-icers. This de-icer is comprised of an energy storage unit, a coil assembly and a trigger unit. A wave is propagated in the metal surface being protected to debond any ice accreted thereto.

It has proven necessary to apply electrically powered de-icers to moving parts, such as stator blades in air compressors and helicopter rotor blades. U.S. Pat. No. 2,547,934 dated Apr. 10, 1951 to Gill discloses an induction heater for axial flow air compressors, such as those used in the compressors of turbojet aircraft engines. A rapid rise and fall of magnetic flux is generated to produce eddy currents in the stators. These eddy currents heat the metal blades. The heating prevents formation and accretion of ice on the stator blades. Alternating current is used for the magnetizing power source; some stator heating results from the use of alternating current due to hysteresis loss. That effect is greater at higher frequencies. An electrically conductive connection from coil to slip ring is required. Rotor blades with de-icing devices have also been disclosed (U.S. Pat. No. 2,842,214 dated Jul. 8, 1958 to Prewitt and U.S. Pat. No. 2,540,472 dated Feb. 6, 1951 to Boyd, et al.).

One of the main objects of this invention is to provide electrical power for de-icing to rotating aircraft components, such as helicopter rotor blades, without the use of costly, complicated and high maintenance slip rings or high output alternators/generators. To date, electrical power transmission to rotating components of aircraft has required the use of slip rings to transmit power from a stationary object to the rotating component. These rings introduce deficiencies for a variety of reasons: they wear and must be replaced; electrical contact becomes intermittent after ring wear occurs; and the high power requirements placed on the rings makes them unreliable for critical aircraft applications. The other main objects of this invention are to provide high reliability, lightweight de-icing means for rotating aircraft components; and de-icing means having high voltage and high current capabilities while requiring cables of smaller diameter to conduct power to protected surfaces.

SUMMARY OF THE INVENTION

The present invention is a de-icer for the rotary airfoil blades of an aircraft. In one embodiment, the invention comprises a multiplicity of magnets arranged around the rotor mast, the specific number selected to produce the desired number of electronic pulses introduced into each blade during one mast revolution, a coil with laminated metal plates arranged at the root end of each airfoil rotor blade, the magnets and coils being placed in sufficient proximity to each other to induce a high voltage and high current when they pass each other. The coils are electrically connected to electrically conductive lead cable or wire placed down the length of each rotor blade, and electrically connected to resistance heating elements which convert the voltage pulses into heat for de-icing the rotor blades.

In one embodiment, the magnets are comprised of metals having magnetic properties. In this embodiment, if it is desirable to introduce switch means for turning the de-icer off and on into the system, the magnets may be arranged in a polarized/non-polarized mode to provide a switchable magnetic source.

In another embodiment, the magnets are electromagnets electrically connected to a source of electrical generation of the aircraft. In this embodiment, several switching means are possible. These include a low voltage slip ring for grounding the coil; means for energizing or deenergizing the electromagnets; and a slidable shield for covering or exposing the magnets in their respective off or on modes.

THE PREFERRED EMBODIMENTS

Figure 1A:
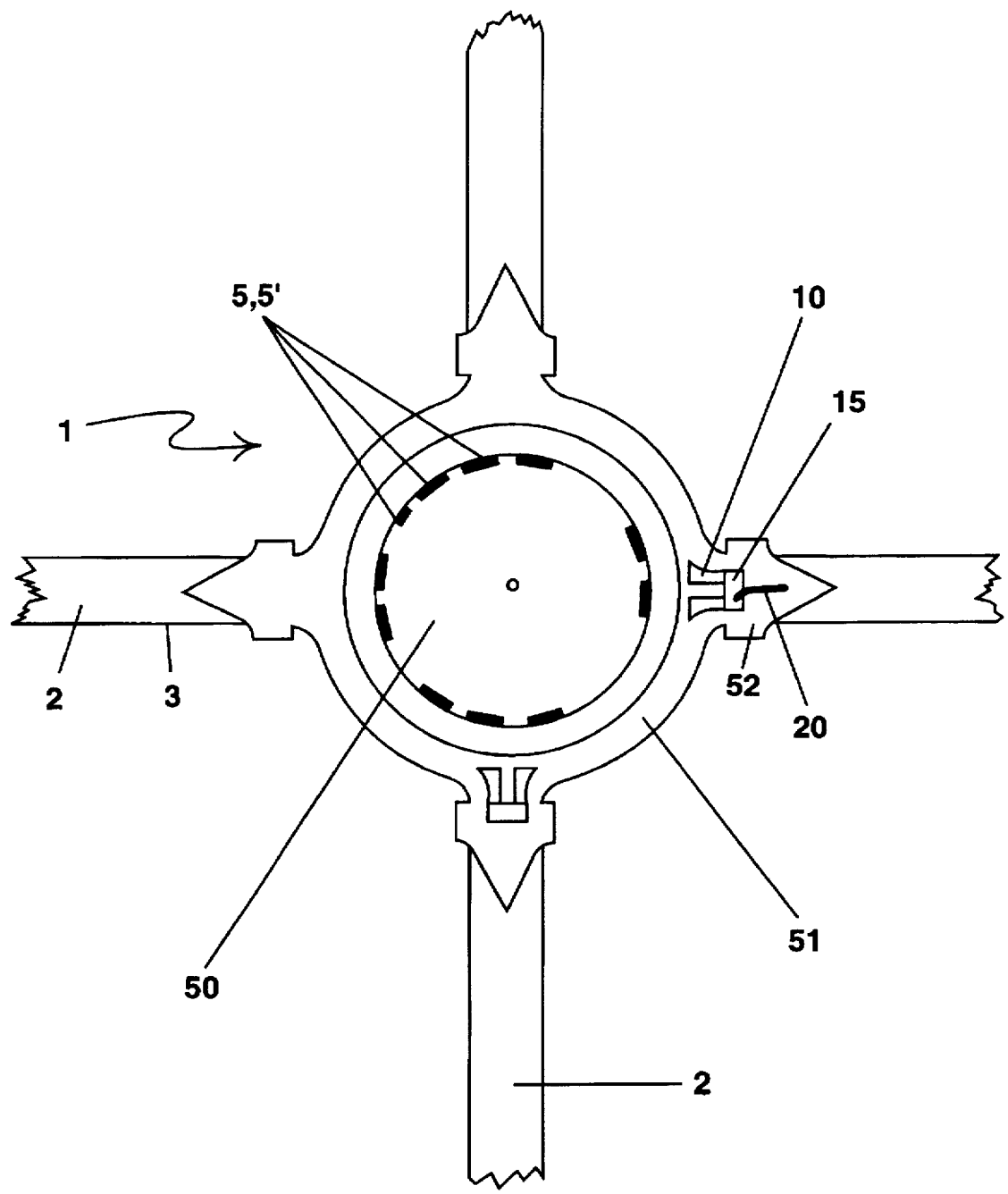
FIG. 1A is a top view of a helicopter main rotor blade showing the spatial arrangement and interrelationships of the elements of the de-icing means of the invention.
Figure 1B:
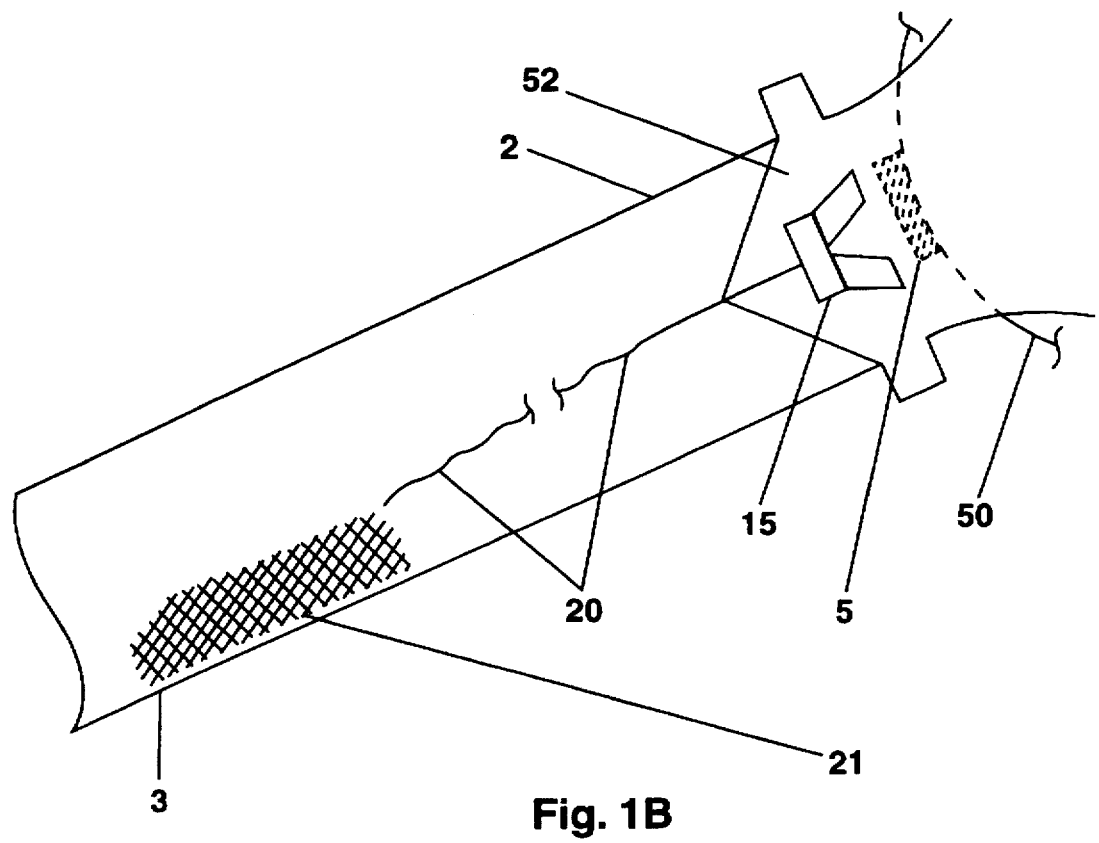
FIG. 1B is a detail taken from the top view of a helicopter main rotor blade showing spatial arrangement and interrelationships of elements of the de-icing system of the invention and also showing details of the blade cuff, electrically conductive lead means for carrying current from the coil down the length of the blade ("lead"), and resistance heating element.
Figure 1C:
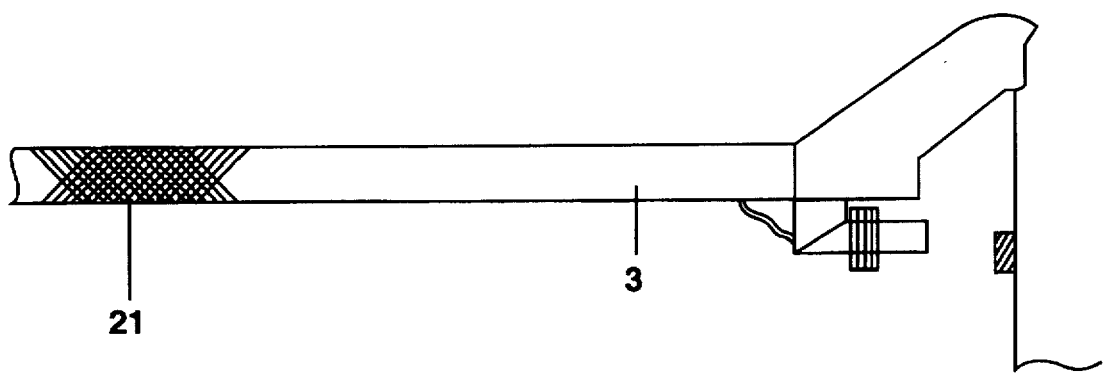
FIG. 1C is an edge view of the basic components and spatial relationships show in FIG. 1B.
Figure 1D:
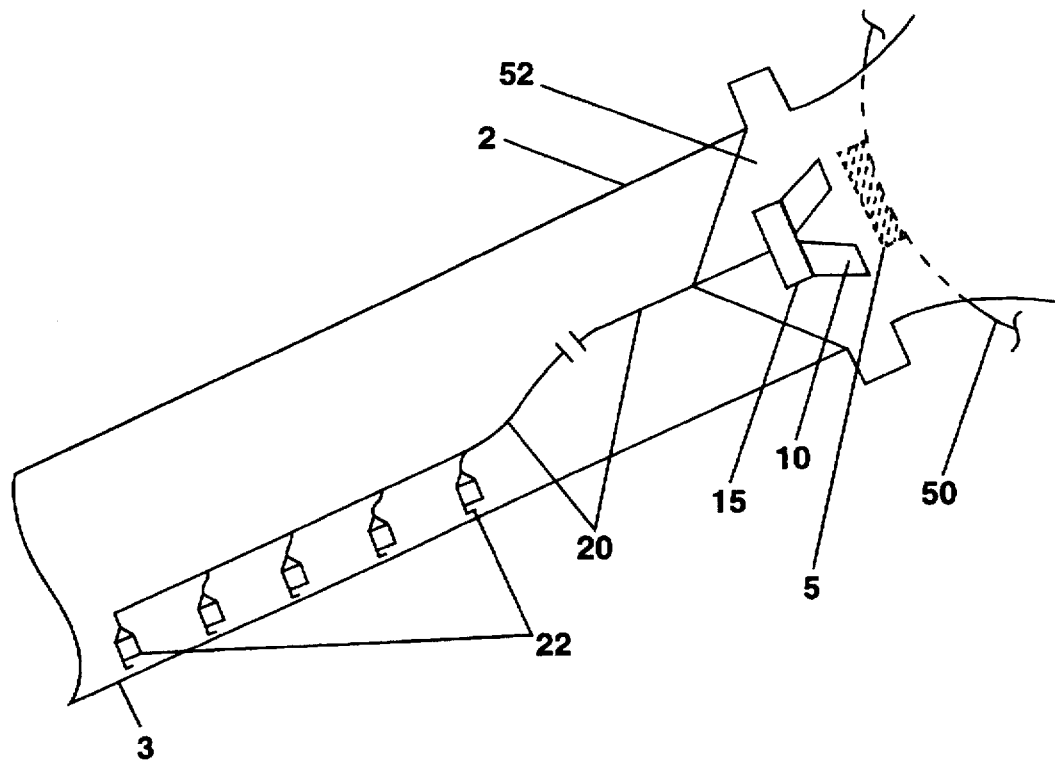
FIG. 1D is essentially the same detail as FIG. 1B showing an alternative layout of resistance heating elements.
Figure 1E:
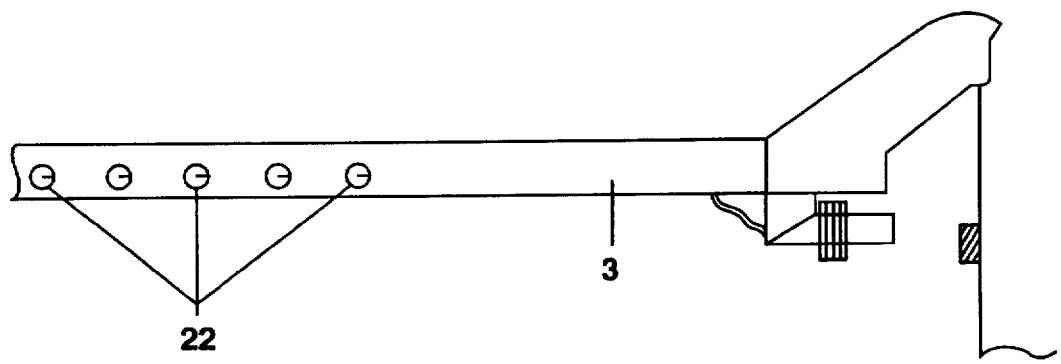
FIG. 1E is an edge view from FIG. 1D.
Figure 3:
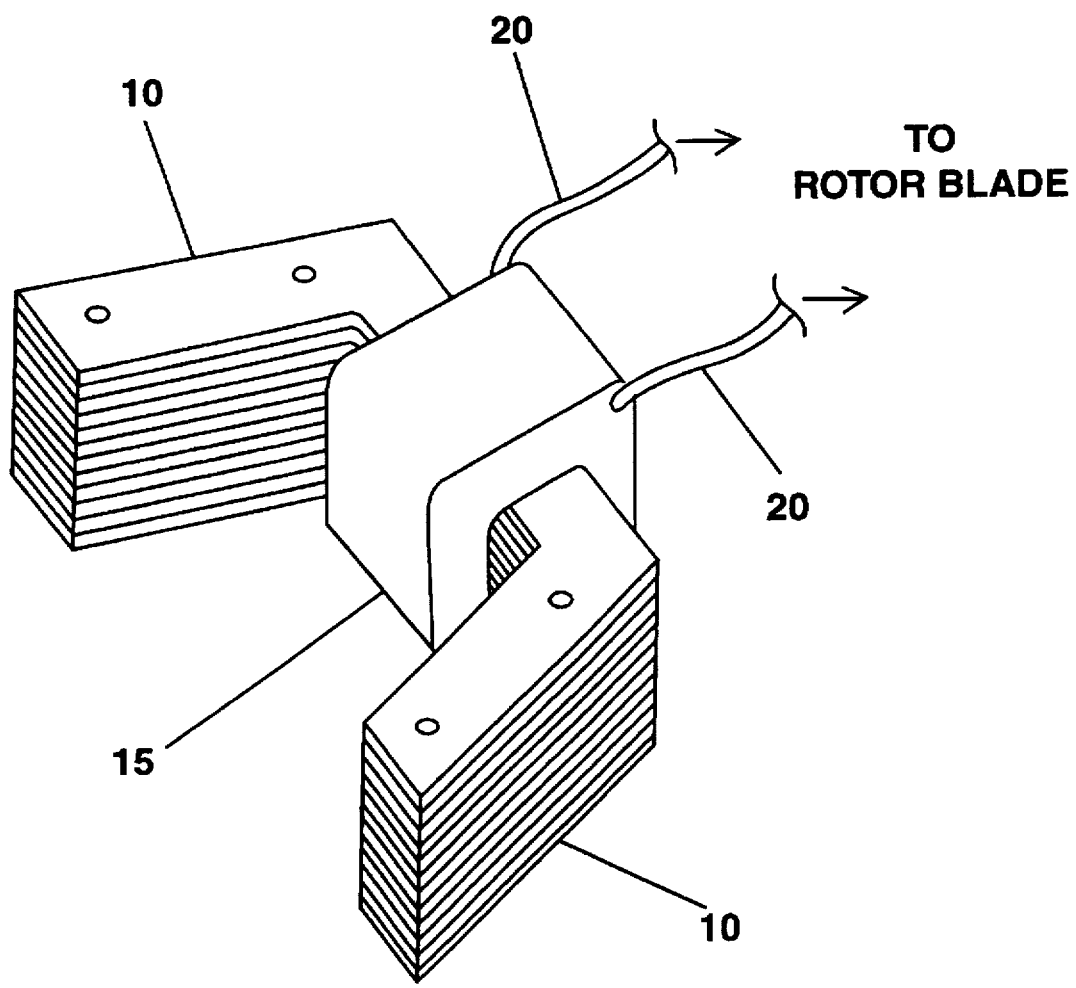
FIG. 3 is a detail view of a typical coil/laminated plate assembly showing the components of the assembly incorporated into the other figures.

Power can be produced at each blade of a rotating component by using a series of magnets and coils. In FIG. 1A, a helicopter main rotor hub 51 and blade assembly 1 is shown. Magnets 5 are placed at strategic points on the rotor mast 50. Laminated metal plates 10 integrated with a coil 15 are mounted on each rotor blade cuff 52 or rotating head. A close-up view of the laminated plates 10 and coil 15 is shown in FIG. 3. As the rotor head rotates through its cycle, or the laminated metal plates 10 with integral coil 15 pass the magnets 5 fixed on it, the magnets 5 pass by the laminated metal plates 10. This induces a high voltage and current that can be used for de-icing or for providing power through a small diameter lead or cable 20 to servos or actuators (not shown) that can now be mounted directly on the blade 2. De-icing can be accomplished by sending this induced voltage to resistive heating blankets 21 (FIGS. 1B and 1C) mounted on the blade spans 2 at intervals, or continuously, where needed. Alternatively, a sequential series of pulsed arcs 22 to heat a metallic strip (FIGS. 1D and 1E) that could be mounted externally or internally the length of the blade 2, especially along a leading edge 3. The laminated plates 10/coils 15 would themselves be mounted close enough to the central rotating structure (the rotor hub 51) that blade integrity would not be adversely affected and any effects of centrifugal force would be minimized.

Figure 2A:
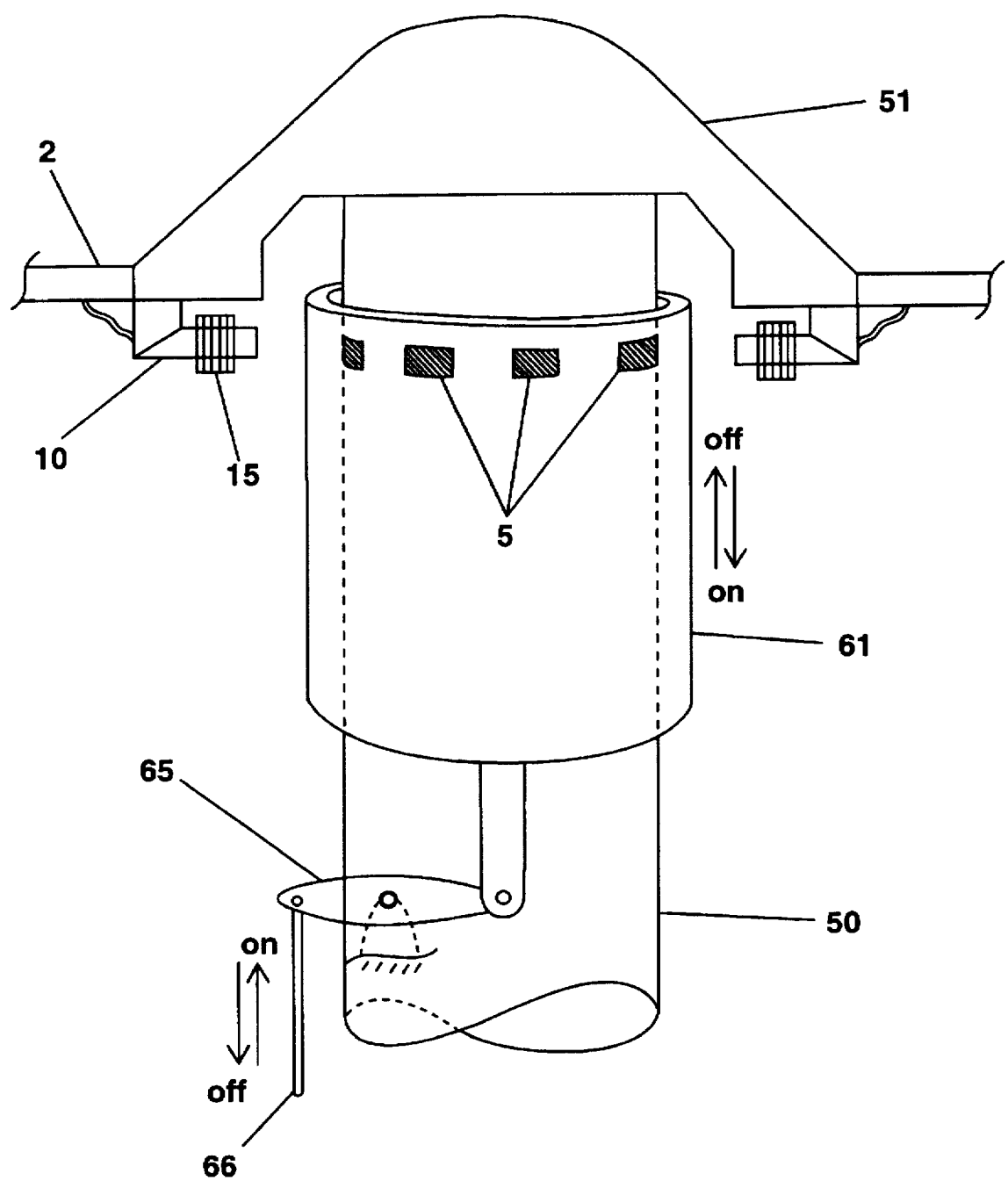
FIG. 2A is a side view of a helicopter main rotor mast and head showing magnetic shield method for switching the power producing system on and off.
Figure 2B:
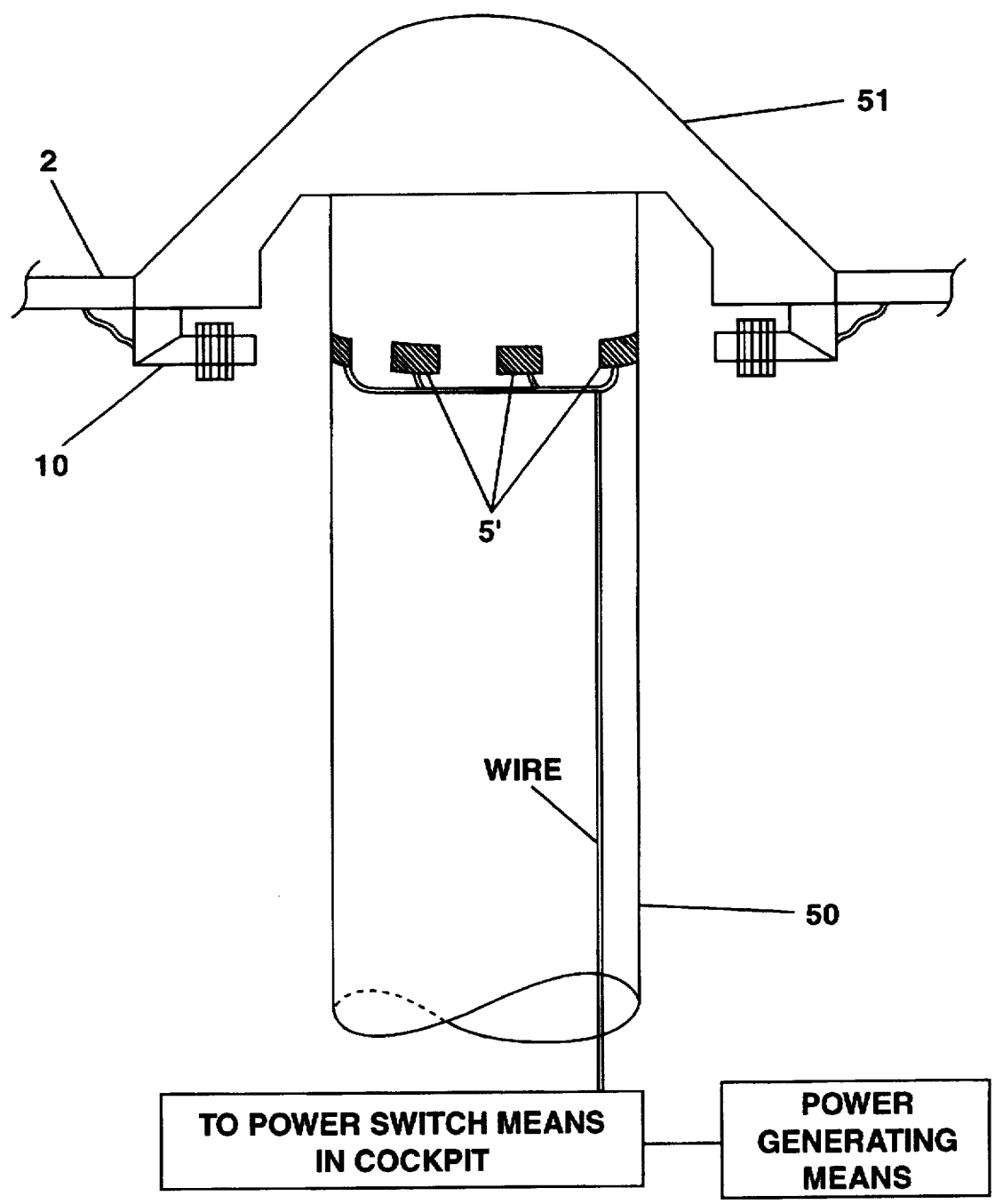
FIG. 2B is a side view of a helicopter main rotor mast and head showing electromagnet method for switching the power producing system on and off.
Figure 2C:
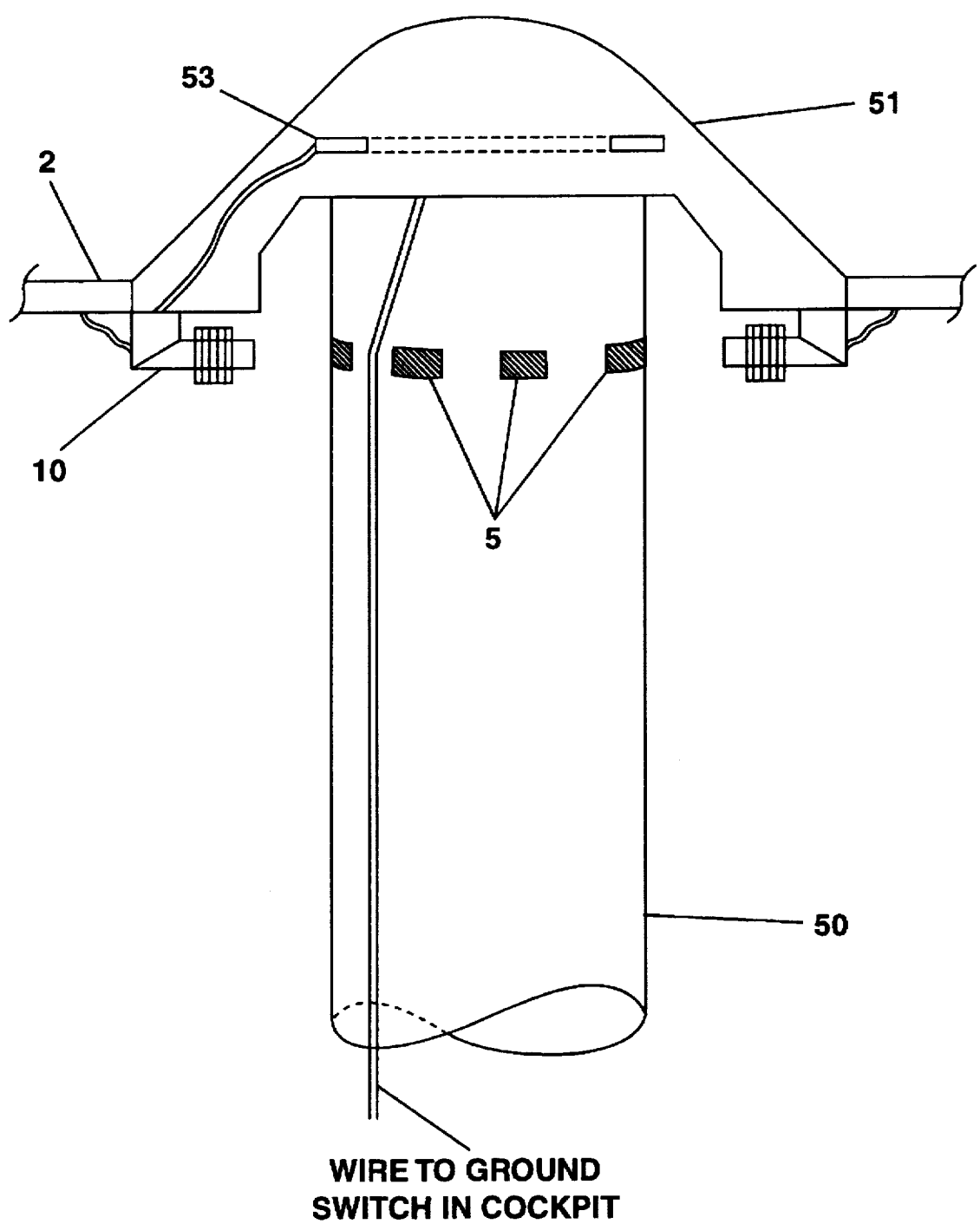
FIG. 2C is also is a side view of a helicopter main rotor mast and head showing slip ring method for switching the power producing system on and off by grounding coil.

The number of magnets 5 mounted on the rotor mast 50 would determine the number of voltage pulses introduced into each blade 2 during one revolution. This power producing system could be controlled, i.e., turned on and off, in a number of ways. One way would be to use a small, low voltage slip ring 53 that grounds the coil on the blade so no voltage would be produced (FIG. 2C). Another method would be to use electromagnets 5' on the rotor mast 50 instead of fixed magnets 5 (FIGS. 1A, 2B). By deenergizing the electromagnets, no field would be created and no voltage would be generated. Another method would be to use fixed magnets 5 in a polarized/non-polarized mode to provide a switchable magnetic source. Another method is depicted in FIG. 2A. In this depiction, a shield 61 is slidably mounted over the rotor mast 50 on which are mounted the magnets 5. The shield 61 is moved to its on or off position by a bellcrank assembly 65 and actuator rod 66. The cylinder or shield 61 slides into place over the ring of magnets 5 mounted to the rotor mast 50 to shield the magnetic force from the laminated plates 10. The use of shielded cable 20 and component housings would preclude the effects of electromagnetic interference (EMI). The voltages and currents produced would be governed by the size and number of turns of wire in the coil, the size of the magnets and the number and size of the laminated steel plates.

What is claimed is:

1. A rotary blade de-icer for aircraft having a rotor mast and hub, and a multiplicity of airfoil rotor blades, each rotor blade having a root end and an outboard end, with a blade cuff at the root end and a leading edge and a lagging edge, comprising:

a multiplicity of magnets placed on the rotor mast; a coil integrated with laminated metal plates mounted on each rotor blade cuff; the magnets and the coil with laminated plates being mounted in sufficient proximity to each other so that as the rotor turns through its cycle the magnets pass the laminated metal plates so as to induce a high voltage and high current; electrically conductive lead means for carrying current from the coil down the length of each rotor blade; electrical resistance heating means connected to said lead means for imparting heat to the blade surface to melt accreted ice.

2. The rotary blade de-icer described in claim 1 in which the electrically conductive lead means comprises small diameter cable.

3. The rotary blade de-icer described in claim 1 further comprising switch means for turning the de-icer on and off.

4. A rotary blade de-icer for aircraft having electrical power generating means; a rotor mast and hub, and a multiplicity of airfoil rotor blades, each rotor blade having a root end and an outboard end, with a blade cuff at the root end and a leading edge and a lagging edge, comprising:

a multiplicity of electromagnets placed on the rotor mast and connected by electrically conductive wire means to the electrical power generating means; a coil integrated with laminated metal plates mounted on each rotor blade cuff; the magnets and the coil with laminated plates being mounted in sufficient proximity to each other so that as the rotor turns through its cycle the magnets pass the laminated metal plates so as to induce a high voltage and high current; electrically conductive lead means for carrying current from the coil down the length of each rotor blade; electrical resistance heating means connected to said lead means for imparting heat to the blade surface to melt accreted ice.

5. The rotary blade de-icer described in claim 4 in which the electrically conductive lead means comprises small diameter cable.

6. The rotary blade de-icer described in claim 4 further comprising switch means for turning the electrical power generating means on and off.

7. The rotary blade de-icer described in claim 6 in which the switch means comprises means for grounding the coil on the blade so that no voltage or current would be produced.

8. The rotary blade de-icer described in claim 6 in which the switch means comprises means for energizing and deenergizing the electromagnets.

9. The rotary blade de-icer described in claim 6 in which the switch means comprises shield means slidably mounted over the rotor mast to cover the magnets in the off position and expose them in the on position.

* * * * *